US011648979B2

(12) United States Patent
Aoki et al.

(10) Patent No.: US 11,648,979 B2
(45) Date of Patent: May 16, 2023

(54) STEERING SYSTEM (71) Applicants: TOYOTA JIDOSHA KABUSHIKI KAISHA, Toyota (JP); JTEKT CORPORATION, Osaka (JP)

(72) Inventors: Toshimasa Aoki, Okazaki (JP); Shuji Fujita, Miyoshi (JP); Koki Sato, Toyota (JP); Hiroki Fukui, Nisshin (JP); Tsuyoshi Ikeda, Chiryu (JP)

(73) Assignees: TOYOTA JIDOSHA KABUSHIKI KAISHA, Toyota (JP); JTEKT Corporation, Osaka (JP)

( * ) Notice: Subject to any disclaimer, the term of this patent is extended or adjusted under 35 U.S.C. 154(b) by 572 days.

(21) Appl. No.: 16/798,673

(22) Filed: Feb. 24, 2020

(65) Prior Publication Data

US 2020/0324806 A1 Oct. 15, 2020

(30) Foreign Application Priority Data

Apr. 15, 2019 (JP) .............................. JP2019-077310

(51) Int. Cl.
*B62D 6/02* (2006.01)
*B62D 5/06* (2006.01)
(Continued)

(52) U.S. Cl.
CPC ......... *B62D 5/0463* (2013.01); *B62D 5/0409* (2013.01); *B62D 5/063* (2013.01); *B62D 6/02* (2013.01); *B62D 7/16* (2013.01)

(58) Field of Classification Search
CPC .... B62D 5/0463; B62D 5/0409; B62D 5/063; B62D 6/02; B62D 5/06; B62D 5/064; B62D 5/065; B62D 7/16
See application file for complete search history.

(56) References Cited

U.S. PATENT DOCUMENTS 6,064,166 A * 5/2000 Kaji ....................... B62D 5/065
                                                          318/272
6,167,334 A   12/2000 Liubakka et al.
(Continued)

FOREIGN PATENT DOCUMENTS

CN        104176115 A    12/2014
JP      2006-213094 A    8/2006
(Continued)

*Primary Examiner* — Kevin Hurley
*Assistant Examiner* — Michael R Stabley
(74) *Attorney, Agent, or Firm* — Sughrue Mion, PLLC (57) ABSTRACT

A steering system installed on a vehicle, including: a steering mechanism including a steering member and configured to enable a wheel to be steered in accordance with a movement of the steering member; an operation assist device configured to apply a torque to a steering shaft for assisting an operation of a steering operation member; a steering assist device configured to assist the movement of the steering member utilizing a working fluid; and a controller configured to control a torque applied to the steering shaft by the operation assist device and control a supply flow rate of the working fluid, wherein the steering assist device assists the movement of the steering member with an assist force that depends on the supply flow rate, and the controller increases the supply flow rate when an operation speed of the steering operation member becomes equal to or higher than a set threshold speed.

10 Claims, 3 Drawing Sheets

(51) Int. Cl.
*B62D 5/04* (2006.01)
*B62D 7/16* (2006.01)

(56) References Cited

U.S. PATENT DOCUMENTS

| | | | | |
|---|---|---|---|---|
| 6,366,842 | B1* | 4/2002 | Kaji | B62D 5/065 |
| | | | | 180/443 |
| 7,164,978 | B2* | 1/2007 | Takaki | B62D 5/065 |
| | | | | 180/443 |
| 8,983,731 | B2* | 3/2015 | Chauvelier | B62D 6/001 |
| | | | | 701/42 |
| 9,415,801 | B2* | 8/2016 | Hata | B62D 5/22 |
| 10,518,802 | B2* | 12/2019 | Wang | B62D 5/30 |
| 10,759,471 | B2* | 9/2020 | Ueyama | B62D 5/0463 |
| 2013/0297153 | A1* | 11/2013 | Chauvelier | B62D 5/065 |
| | | | | 701/42 |
| 2014/0074355 | A1 | 3/2014 | Kim et al. | |
| 2014/0345965 | A1 | 11/2014 | Ura | |
| 2015/0144417 | A1* | 5/2015 | Hata | B62D 5/22 |
| | | | | 180/422 |
| 2018/0022381 | A1 | 1/2018 | Matsumura et al. | |
| 2018/0339727 | A1* | 11/2018 | Ueyama | B62D 5/065 |
| 2019/0193779 | A1* | 6/2019 | Wang | B62D 5/0484 |

FOREIGN PATENT DOCUMENTS

| | | |
|---|---|---|
| JP | 2014-051263 A | 3/2014 |
| JP | 2016-150644 A | 8/2016 |
| JP | 2018-47715 A | 3/2018 |
| KR | 10-2014-0100011 A | 8/2014 |

\* cited by examiner

STEERING SYSTEM

CROSS REFERENCE TO RELATED APPLICATION

The present application claims priority to Japanese Patent Application No. 2019-077310, which was filed on Apr. 15, 2019, the disclosure of which is herein incorporated by reference in its entirety.

BACKGROUND

Technical Field

The following disclosure relates to a steering system installed on a vehicle.

Description of Related Art

An ordinary steering system installed on a vehicle includes (a) a steering operation member operated by a driver, (b) a steering shaft coupled to the steering operation member and configured to rotate in accordance with an operation of the steering operation member, and (c) a steering mechanism including a steering member coupled to a wheel and configured to cause the steering member to move in accordance with rotation of the steering shaft so as to enable the wheel to be steered in accordance with a movement of the steering member. It has been proposed that such a steering system further include two assist devices as described in Patent Document 1 (Japanese Patent Application Publication No. 2014-51263), for instance, specifically, (d) an operation assist device configured to apply a torque to the steering shaft so as to assist the operation of the steering operation member and (e) a steering assist device including a working-fluid supply source for supplying a working fluid and configured to assist the movement of the steering member of the steering mechanism utilizing the working fluid supplied from the working-fluid supply source.

SUMMARY

In the steering system described in the Patent Document 1, a torque applied to the steering shaft by the operation assist device (hereinafter referred to as "assist torque" where appropriate) and an assist force for assisting the movement of the steering member are cooperatively controlled based on an operation amount of the steering operation member and a running speed of the vehicle. Even if the cooperative control is executed, it is anticipated that the steering of the wheel will be delayed with respect to the operation of the steering operation member in the case where an operation speed of the steering operation member is high. In the case where the steering assist device is configured to assist the movement of the steering member with the assist force that depends on a supply flow rate that is a flow rate of the working fluid supplied from the working-fluid supply source, the delay of the steering is less likely to occur if the supply flow rate is always kept high. However, keeping the supply flow rate always high undesirably increases energy consumption for supplying the working fluid to a considerable extent. Thus, solving the problem leads to an improvement in the utility of the steering system that includes the two assist devices. Accordingly, one aspect of the present disclosure is directed to a steering system having high utility.

The steering system according to one aspect of the present disclosure includes a steering assist device configured to assist a movement of a steering member with an assist force that depends on a supply flow rate of a working fluid. In the steering system, the supply flow rate of the working fluid is increased when an operation speed of the steering operation member becomes equal to or higher than a set threshold speed.

In the steering system constructed as described above, the delay of the steering can be prevented by increasing the supply flow rate of the working fluid supplied form the working-fluid supply source of the steering assist device when the operation speed of the steering operation member is relatively high, and energy consumption of the working-fluid supply source of the steering assist device can be made small by decreasing the supply flow rate when the operation speed of the steering operation member is relatively low.

Various Forms

A steering system according to a basic form of the present disclosure is a steering system installed on a vehicle that includes:

a steering operation member operated by a driver;

a steering shaft coupled to the steering operation member and configured to rotate in accordance with an operation of the steering operation member;

a steering mechanism including a steering member coupled to a wheel and configured to cause the steering member to move in accordance with rotation of the steering shaft so as to enable the wheel to be steered in accordance with a movement of the steering member;

an operation assist device configured to apply a torque to the steering shaft so as to assist the operation of the steering operation member;

a steering assist device including a working-fluid supply source for supplying a working fluid and a flow-rate adjusting mechanism configured to adjust a supply flow rate that is a flow rate of the working fluid supplied from the working-fluid supply source, the steering assist device being configured to assist the movement of the steering member of the steering mechanism utilizing the working fluid supplied from the working-fluid supply source; and a controller configured to control the torque applied to the steering shaft by the operation assist device and configured to control the flow-rate adjusting mechanism of the steering assist device so as to control the supply flow rate of the working fluid, wherein the steering assist device is configured to assist the movement of the steering member with an assist force that depends on the supply flow rate of the working fluid, and wherein the controller is configured to increase the supply flow rate of the working fluid when an operation speed of the steering operation member becomes equal to or higher than a set threshold speed.

In the steering system according to the basic form, the "steering operation member" is a steering wheel, for instance. In the case where the steering operation member is the steering wheel, the operation amount can be considered as a rotation angle of the steering wheel, namely, an operation angle of the steering wheel. The "steering shaft" couples the steering operation member and the steering mechanism. The steering shaft is held on a vehicle body through what is called steering column, for instance. Various types of the "steering mechanism" can be employed. For instance, there may be employable, as the steering mechanism, a rack-and-pinion mechanism which includes: a pinion shaft including a pinion and functioning as an input shaft that is coupled to the steering shaft and that is configured to be rotated by a torque applied from the steering shaft; and a rack bar disposed so as to connect right and left wheels and having a rack that is in mesh with the pinion, the rack bar functioning as the steering member configured to be moved by the rotation of the input shaft so as to steer the wheels.

The "steering assist device" as one of the two assist devices is a device to assist the movement of the steering member utilizing the working fluid, so as to assist steering of the wheel. That is, the steering assist device may be the one employed in an ordinary hydraulic power steering system. The present steering assist device assists the movement of the steering member in consideration of the possibility that adequate steering is not performed only by a force applied to the steering operation member by a driver. This force will be hereinafter referred to as "operation force" where appropriate. The steering assist device may be configured to apply the assist force to the steering member. Alternatively, in the case where the steering mechanism includes the input shaft described above, the steering assist device may be configured to apply, as a torque, the assist force to the input shaft. That is, the steering assist device is configured to directly or indirectly assist the movement of the steering member.

In the case where the steering assist device includes the input shaft described above, the steering assist device is preferably configured to apply the assist force corresponding to a steering torque that is a torque applied to the input shaft from the steering shaft. Specifically, in the case where the steering assist device includes the input shaft and an actuator configured to receive the working fluid and to apply the assist force to the steering member, a torsion bar may be disposed between the input shaft and the steering shaft, and there may be provided a valve mechanism configured to adjust, in accordance with a twisted amount of the torsion bar, a flow rate of the working fluid received by the actuator, so that the steering device can be configured to apply the assist force corresponding to the steering torque.

The working-fluid supply source of the steering assist device is a pump, for instance. The pump may be an electric pump driven by an electric motor as a drive source or may be an engine pump driven by an engine of the vehicle as a drive source. The engine pump is highly reliable and widely used in a hydraulic steering assist device. Thus, employment of the engine pump enables the steering system of the present disclosure to be applied to an ordinary steering assist device. In the case where the engine pump is employed, the supply flow rate of the working fluid can be made low except when the operation speed of the steering operation member is relatively high, thus resulting in a reduction of a load of the engine. In the case where the engine pump is employed, therefore, the steering system of the present disclosure largely contributes to enhancement of fuel economy of the vehicle.

The flow-rate adjusting mechanism of the steering assist device may be configured to include an electromagnetic valve or valves, and the controller may control the electromagnetic valve or valves, for thereby adjusting the flow rate of the working fluid supplied from the working-fluid supply source. The flow-rate adjusting mechanism is preferably configured such that the load of the working-fluid supply source is small when the supply flow rate is low though the load of the working-fluid supply source is large when the supply flow rate is high. It is noted that the flow rate of the working fluid generally means a flow amount of the working fluid per unit time.

The control of the flow-rate adjusting mechanism by the controller will be explained. The supply flow rate of the working fluid is controlled so as to be increased when the operation speed of the steering operation member becomes equal to or higher than the set threshold speed. The operation speed of the steering operation member will be hereinafter simply referred to as "operation speed" where appropriate. When the operation speed is relatively low, the steering of the wheel by the steering mechanism can adequately follow the operation of the steering operation member, and the load of the working-fluid supply source is made small by making the supply flow rate low. When the operation speed is relatively high, in contrast, it is highly likely that the steering of the wheel by the steering mechanism cannot follow the operation of the steering operation member. In this case, the assist force that can prevent or reduce the delay of the steering is obtained by increasing the supply flow rate. By changing the load of the working-fluid supply source based on the operation speed of the steering operation member, the delay of the steering with respect to the steering operation can be prevented or reduced while energy consumption of the working-fluid supply source is reduced as much as possible and while fuel consumption of the vehicle is reduced in the case where the working-fluid supply source is the engine pump.

A form in which the supply flow rate is increased when the operation speed is equal to or higher than the set threshold speed will be explained in detail. At a time point when the operation speed becomes equal to the set threshold speed, the supply flow rate of the working fluid may be increased instantaneously up to the set high flow rate from the current set low flow rate. Alternatively, the supply flow rate of the working fluid may be increased from the set low flow rate up to the set high flow rate stepwise or continuously depending upon the level of the operation speed from the time point when the operation speed becomes equal to the set threshold speed.

The "operation assist device" as the other of the two assist devices is configured to apply the torque, i.e., the assist torque, to the steering shaft, so as to reduce a driver's load for the steering operation and to improve an operational feeling felt by the driver. By positively applying the assist torque, the operation assist device enables the steering system to perform the steering operation that does not rely on the driver. For instance, the operation assist device enables the steering system to perform the steering operation in accordance with a request from a self-driving system of the vehicle, a request from a driving support system for keeping the vehicle running within a driving lane in which the vehicle is running, or the like. The assist torque applied by the operation assist device is not limited to a torque in a direction to promote the steering operation by the driver. In some instances, the assist torque applied by the operation assist device may be a torque in a direction to counter the steering operation performed by the driver, that is, the assist torque may be a counter torque that may be also referred to as "counterforce (reaction force) torque".

The source of generation of the assist torque to be applied by the operation assist device is not limited to any particular one. For instance, the operation assist device may include an electric motor as the generation source of the assist torque. Employment of the electric motor as the generation source of the assist torque achieves construction of the operation assist device excellent in response, thus further improving the operational feeling felt by the driver.

From the viewpoint of reducing the driver's load for the steering operation, the operation assist device is preferably configured to give, to the steering shaft, the assist torque corresponding to an operation torque, and the controller is preferably configured to control the operation assist device to apply such assist torque. In the case where the operation assist device includes the electric motor as the generation source of the assist torque, the controller may be configured to control an electric current supplied to the electric motor so as to control the assist torque. The present steering system may include a sensor for detecting the operation torque that is a torque applied to the steering shaft by the operation of the steering operation member, i.e., an operation torque sensor. In the case where the steering operation member is the steering wheel, a torsion bar may be disposed between the steering wheel and the steering shaft, and the operation torque sensor may be configured to detect a twisted amount of the torsion bar so as to detect the operation torque.

The control of the operation assist device by the controller, namely, the control of the assist torque by the controller, will be explained. The controller may control the assist torque based on the operation speed of the steering operation member, for instance.

Further, the controller may control the assist torque based on the operation amount of the steering operation member, in other words, based on the operation angle of the steering wheel in the case where the steering operation member is the steering wheel.

Moreover, the controller may control the assist torque based on the running speed of the vehicle. In this instance, the operation assist device may be controlled such that the assist torque becomes smaller with an increase in the running speed of the vehicle.

In other words, the assist torque is controlled based on at least one of the parameters such as the operation speed of the steering operation member, the operation amount of the steering operation member, and the running speed of the vehicle, so that a better operational feeling for the operation of the steering operation member can be given to the driver. The assist torque may be controlled based on one parameter or based on a plurality of parameters. In the case where the assist torque is controlled based on a plurality of parameters, the assist torque may be determined by determining components of the assist torque that correspond to the respective parameters and then adding up the determined components of the assist torque.

As the "controller", there may be employed an electronic control unit including a computer as a main constituent element and further including a drive circuit of the operation assist device and a drive circuit of the flow-rate adjusting mechanism of the steering assist device. The controller may be constituted by one electronic control unit configured to control both the operation assist device and the flow-rate adjusting mechanism of the steering assist device. Alternatively, the controller may be constituted by two electronic control units each of which includes a computer. In other words, the controller may be constituted by an electronic control unit for controlling the operation assist device and an electronic control unit for controlling the flow-rate adjusting mechanism of the steering assist device.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained in detail a steering system according to one embodiment of the present disclosure. It is to be understood that the present disclosure is not limited to the details of the following embodiment but may be embodied based on the forms described in Various Forms and may be changed and modified based on the knowledge of those skilled in the art.

A. Hardware Configuration of Steering System

Figure 1:
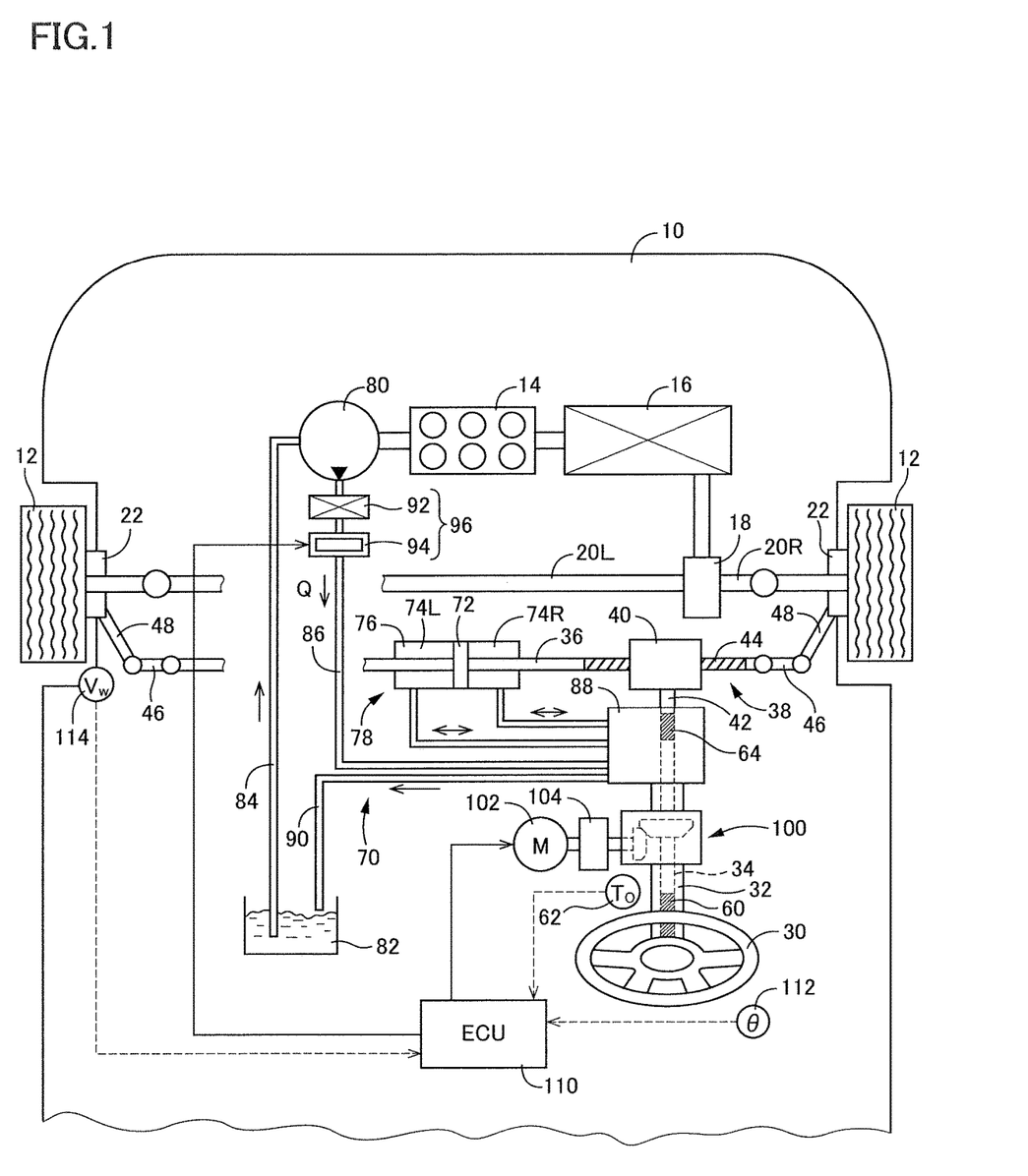
FIG. 1 is a view schematically illustrating an overall structure of a steering system according to one embodiment.

As illustrated in FIG. 1, a vehicle 10 on which is installed a steering system according to one embodiment includes two front wheels 12 each as a steerable wheel and as a drive wheel. The vehicle 10 includes an engine 14 as a drive source. Rotation of the engine 14 is transmitted to each of the front wheels 12 held by respective steering knuckles 22a via a torque converter/transmission 16, a differential 18, and respective drive shafts 20R, 20L. The vehicle 10 runs by the rotation of the front wheels 12.

The steering system according to the present embodiment includes (a) a steering wheel 30, as a steering operation member, operated by a driver, (b) a steering shaft 34 which is held by a steering column 32 and one end of which is coupled to the steering wheel 30 so as to rotate in accordance with an operation of the steering wheel 30, and (c) a steering mechanism 38 including a steering rod 36, as a steering member, opposite ends of which are respectively coupled to the front wheels 12 and which extends in a width direction of the vehicle, the steering mechanism 38 being configured to move the steering rod 36 in accordance with rotation of the steering shaft 34 so as to enable the front wheels 12 to be steered in accordance with a movement of the steering rod 36.

The steering mechanism 38 includes an input shaft 42 to which the other end of the steering shaft 34 is coupled and which is held by a gear box 40. A pinion is formed on a portion of the input shaft 42, which portion is located within the gear box 40. The steering rod 36 is also held by the gear box 40, and a rack 44 meshing with the pinion is formed on the steering rod 36. That is, the steering mechanism 38 includes a rack and pinion motion converting mechanism. The rotation of the steering shaft 34 causes the input shaft 42 to rotate, so that the steering rod 36 moves in the vehicle width direction. The steering rod 36 is coupled at its opposite ends respectively to knuckle arms 48 of the respective steering knuckles 22 that respectively hold the front right and left wheels 12, via respective link rods 46. The front wheels 12 are steered by the movement of the steering rod 36.

The one end of the steering shaft 34 is coupled to the steering wheel 30 via a first torsion bar 60. The steering column 32 is provided with an operation torque sensor 62 for detecting a twisted amount of the first torsion bar 60 and detecting a torque applied to the steering shaft 34 by the operation of the steering wheel 30. This torque will be hereinafter referred to as "operation torque" where appropriate. In this respect, the operation torque can be regarded as a torque that the driver applies to the steering wheel 30 by the steering operation. The other end of the steering shaft 34 is coupled to the input shaft 42 of the steering mechanism 38 via a second torsion bar 64. A twisted amount of the second torsion bar 64 corresponds to a torque applied to the input shaft 42 by the steering shaft 34. This torque will be hereinafter referred to as "steering torque" where appropriate.

The steering system includes a steering assist device 70 configured to assist the movement of the steering rod 36 of the steering mechanism 38 utilizing a working fluid (working oil). The steering assist device 70 includes a hydraulic actuator 78 including a piston 72 fixed to the steering rod 36 and a housing 76 whose interior is partitioned into two fluid chambers 74R, 74L by the piston 72. The steering assist device 70 further includes an engine pump 80 as a working-fluid supply source driven by the engine 14. The engine pump 80 pumps up the working fluid out of a reservoir 82 storing the working fluid via a pump-up passage 84 and supplies the pumped working fluid to a supply-flow controlling mechanism 88 via a supply passage 86.

The supply-flow controlling mechanism 88 has a known ordinary structure as illustrated in FIG. 2 of Japanese Patent Application Publication No. 6-8840, for instance. Specifically, the supply-flow controlling mechanism 88 has a function of controlling the flow rate of the working fluid to be supplied to the actuator 78 and a function of determining to which one of the two fluid chambers 74R, 74L the working fluid is to be supplied, based on the twisted amount of the second torsion bar 64 and a direction of the twisting, that is, based on the steering torque and a direction of the steering. The supply-flow controlling mechanism 88 is configured to receive the working fluid supplied from the engine pump 80. When the steering torque is not acting on the input shaft 42, the supply-flow controlling mechanism 88 permits the received working fluid to return to the reservoir 82 via a return passage 90. That is, the working fluid is circulated. When the steering torque is acting on the input shaft 42, on the other hand, the supply-flow controlling mechanism 88 supplies at least a part of the received working fluid to one of the two fluid chambers 74R, 74L of the actuator 78 that corresponds to the direction of the steering, at a flow rate corresponding to the steering torque and receives, from the other of the two fluid chambers 74R, 74L, the working fluid at the same flow rate as the supplied working fluid. The supply-flow controlling mechanism 88 permits the working fluid received from the other of the two fluid chambers 74R, 74L also to return to the reservoir 82. In the actuator 78, a force corresponding to the pressure of the working fluid supplied from the supply-flow controlling mechanism 88 to the one of the two fluid chambers 74R, 74L acts on the piston 72, so that the force (hereinafter referred to as "assist force" where appropriate) assists a steering force that is a force by which the steering rod 36 steers the front wheels 12. In other words, the steering assist device 70 is configured to assist the movement of the steering rod 36 with the assist force corresponding to the steering torque.

The engine pump 80 is configured to eject the working fluid at a flow rate corresponding to a rotational speed of the engine 14. The steering assist device 70 is provided with a flow-rate restricting mechanism 92 disposed on an ejection side of the engine pump 80 for restricting the flow rate of the working fluid ejected from the engine pump 80. The flow-rate restricting mechanism 92 has a known ordinary structure including a valve, as described in Japanese Patent No. 3218788, Japanese Patent Application Publication No. 8-301132, or Japanese Patent Application Publication No. 6-8840, for instance. Specifically, the flow-rate restricting mechanism 92 has a function of restricting, to a set flow rate, the flow rate of the working fluid to be supplied to the supply-flow controlling mechanism 88 after passing therethrough, in the case where the rotational speed of the engine 14 becomes high to a certain extent. Further, the steering assist device 70 is provided with a flow-rate controlling mechanism 94 disposed on an ejection side of the flow-rate restricting mechanism 92 so as to be in series therewith and configured to control the flow rate of the working fluid sent from the flow-rate restricting mechanism 92 to the supply-flow controlling mechanism 88. The flow-rate controlling mechanism 94 is a known ordinary electromagnetic valve mechanism as illustrated in FIG. 2 of Japanese Patent Application Publication No. 2014-19290, for instance. The flow-rate controlling mechanism 94 has a function of allowing passage of the working fluid at a flow rate corresponding to an electric current supplied to a solenoid. The steering assist device 70 includes a mechanism constituted by the flow-rate restricting mechanism 92 and the flow-rate controlling mechanism 94, namely, a flow-rate adjusting mechanism 96 for adjusting the flow rate of the working fluid supplied from the engine pump 80 to the supply-flow controlling mechanism 88. This flow rate will be hereinafter referred to as "supply flow rate" where appropriate.

As understood from the explanation above, the steering assist device 70 is configured to assist the movement of the steering rod 36 with the assist force that depends on the supply flow rate. In general, the assist force increases with an increase in the supply flow rate and decreases with a decrease in the supply flow rate.

The steering system further includes an operation assist device 100 configured to apply a torque to the steering shaft 34 so as to assist the operation of the steering wheel 30. The operation assist device 100 includes an electric motor 102 as a source of generation of the torque applied to the steering shaft 34. This torque will be hereinafter referred to as "assist torque" where appropriate. The torque generated by the electric motor 102 is applied, as the assist torque, to the steering shaft 34 via a speed reducer 104. The electric motor 102 is a three-phase brushless DC motor. The magnitude of the assist torque corresponds to an amount of an electric current supplied to the electric motor 102. This electric current will be hereinafter referred to as "supply current" where appropriate. The assist torque increases with an increase in the supply current and decreases with a decrease in the supply current.

The control of the steering assist device 70 and the operation assist device 100 in the present steering system, specifically, the control of the flow-rate controlling mechanism 94 of the flow-rate adjusting mechanism 96 and the electric motor 102, is executed by an electronic control unit (ECU) 110 as a controller. The ECU 110 is constituted by: a computer, as a main constituent element, including a CPU, a ROM, a RAM, etc.; a drive circuit of the solenoid of the flow-rate controlling mechanism 94; and an inverter that is a drive circuit of the electric motor 102. The drive circuit of the solenoid of the flow-rate controlling mechanism 94 and the inverter are activated by a command from the computer.

The ECU 110 controls the supply flow rate of the working fluid and the assist torque. The steering system is equipped with an operation angle sensor 112 for detecting the operation angle of the steering wheel 30 as the operation amount of the steering operation member and four wheel speed sensors 114 (only one of which is illustrated in FIG. 1) each for detecting a rotational speed of a corresponding one of the four wheels including the two front wheels 12. The operation angle sensor 112, the wheel speed sensors 114, and the operation torque sensor 62 described above are connected to the ECU 110.

B. Control of Steering System i) Control of Supply Flow Rate of Working Fluid in Steering Assist Device As understood from the explanation above, the steering mechanism 38 is for enabling the front wheels 12 to be steered in accordance with the operation angle θ of the steering wheel 30, and the steering assist device 70 is for assisting the movement of the steering rod 36 in order to achieve appropriate steering of the front wheels 12. In the present steering system, the ECU 110 controls the operation angle sensor 112 to detect the operation angle θ of the steering wheel 30 and identifies an operation speed dθ/dt of the steering wheel 30 based on the detected operation angle.

In the case where the operation speed dθ/dt of the steering wheel 30 is relatively high, namely, in the case where the driver performs a relatively quick steering operation, the piston 72 of the actuator 78 moves quickly and therefore the actuator 78 needs to receive the working fluid at a relatively high flow rate. In view of this, the present steering system is configured such that, when the operation speed dθ/dt becomes equal to or higher than a set threshold speed $(dθ/dt)_0$, the supply flow rate Q of the working fluid is made equal to a set high flow rate $Q_H$ that is set as a relatively high flow rate, so as to prevent the flow rate of the working fluid to be received by the actuator 78 from becoming low.

On the other hand, in the case where the operation speed dθ/dt of the steering wheel 30 is relatively low, namely, in the case where the driver performs a relatively slow steering operation, the piston 72 of the actuator 78 moves slowly and therefore the flow rate of the working fluid to be received by the actuator 78 need not be high. In view of this, the present steering system is configured such that, when the operation speed dθ/dt is lower than the set threshold speed $(dθ/dt)_0$, the supply flow rate Q of the working fluid is made equal to a set low flow rate $Q_L$ that is set as a relatively low flow rate, so as to reduce the load of the engine pump 80. The reduction of the load of the engine pump 80 leads to a reduction of the load of the engine 14, thus enhancing fuel economy of the vehicle 10.

As explained before, the supply flow rate Q is changed by changing the electric current supplied to the solenoid of the flow-rate controlling mechanism 94.

ii) Control of Assist Torque Applied by Operation Assist Device

The present steering system is provided with the operation assist device 100 mainly for giving, to the driver, a better operational feeling of the steering wheel 30 felt by the driver in the steering operation. An assist torque $T_A$ applied to the steering shaft 34 by the operation assist device 100 is determined in the following manner.

In the present steering system, three components, i.e., an operation-torque-dependent component $T_{A-TO}$, an operation-speed-dependent component $T_{A-R}$, and an operation-angle-dependent component $T_{A-θ}$, are set as components constituting the assist torque $T_A$. These three components, i.e., the operation-torque-dependent component $T_{A-TO}$, the operation-speed-dependent component $T_{A-R}$, and the operation-angle-dependent component $T_{A-θ}$, are added up according to the following equation so as to determine the assist torque $T_A$ to be applied to the steering shaft 34:

$$T_A = T_{A-TO} + T_{A-R} + T_{A-θ}$$

The operation-torque-dependent component $T_{A-TO}$ is set as a function based on an operation torque $T_O$ and a running speed v of the vehicle as parameters, the operation-speed-dependent component $T_{A-R}$ is set as a function based on the operation speed dθ/dt of the steering wheel 30 and the running speed v of the vehicle as parameters, and the operation-angle-dependent component $T_{A-θ}$ is set as a function based on the operation angle θ of the steering wheel 30 and the running speed v of the vehicle as parameters, as indicated below. The operation-torque-dependent component $T_{A-TO}$, the operation-speed-dependent component $T_{A-R}$, and the operation-angle-dependent component $T_{A-θ}$ are determined according to the respective functions.

$$T_{A-TO} = f_{TO}(T_O, v)$$

$$T_{A-R} = f_R(dθ/dt, v)$$

$$T_{A-θ} = θ(θ, v)$$

Figure 2A:
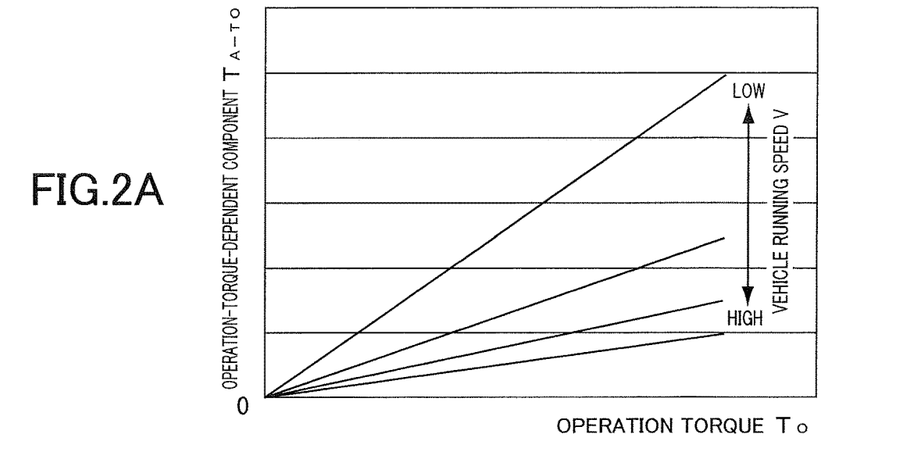
FIG. 2A is a graph indicating a gain for determining an operation-torque-dependent component as one of three components of an assist torque applied by an operation assist device of the steering system according to the embodiment.
Figure 2B:
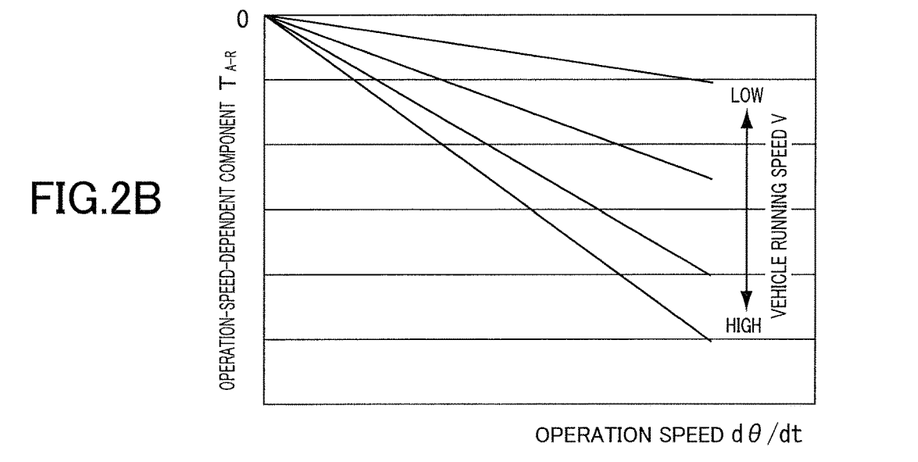
FIG. 2B is a graph indicating a gain for determining an operation-speed-dependent component as another one of the three components of the assist torque applied by the operation assist device of the steering system according to the embodiment.
Figure 2C:
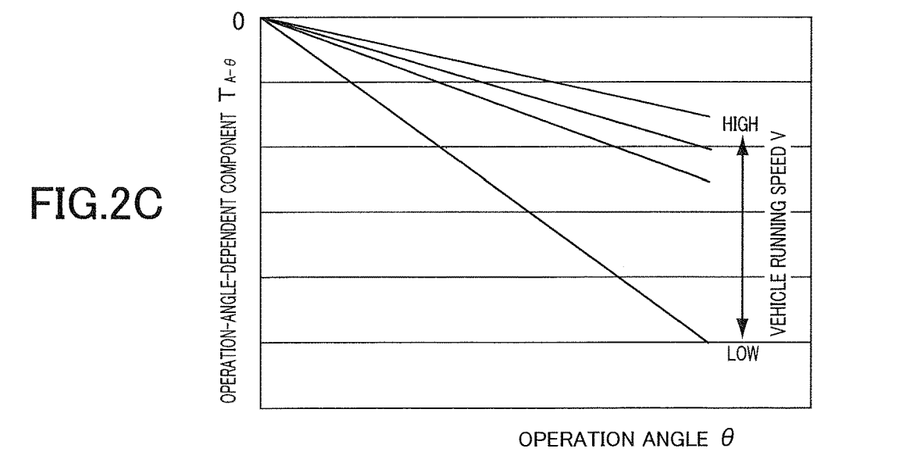
FIG. 2C is a graph indicating a gain for determining an operation-angle-dependent component as still another one of the three components of the assist torque applied by the operation assist device of the steering system according to the embodiment.

According to the respective functions, the operation-torque-dependent component $T_{A-TO}$, the operation-speed-dependent component $T_{A-R}$, and the operation-angle-dependent component $T_{A-θ}$ change with respect to changes of the corresponding parameters, as indicated in respective graphs of FIGS. 2A, 2B, and 2C. The three components will be specifically explained. The operation-torque-dependent component $T_{A-TO}$ is a basic component, namely, one component of the assist torque $T_A$ for promoting the steering operation in order to reduce the load of the driver for the steering operation. As shown in FIG. 2A, the operation-torque-dependent component $T_{A-TO}$ is determined such that the assist torque $T_A$ increases with an increase in the operation torque $T_O$ and decreases with an increase in the running speed v of the vehicle. The operation-speed-dependent component $T_{A-R}$ is a component that may be regarded as a damping force with respect to the steering operation. The operation-speed-dependent component $T_{A-R}$ is a component for applying the assist torque $T_A$ in a direction reverse to a direction of the operation-torque-dependent component $T_{A-TO}$. This assist torque $T_A$ in the reverse direction will be referred to as a counter torque $T_A$ with respect to the steering operation. As illustrated in FIG. 2B, the operation-speed-dependent component $T_{A-R}$ is determined such that the counter torque $T_A$ increases with an increase in the operation speed dθ/dt of the steering wheel 30 and increases with an increase in the running speed v the vehicle. The operation-angle-dependent component $T_{A-θ}$ is a component that may be considered as a force for returning the steering wheel 30 to a neutral position. This force is what is called spring force. Like the operation-speed-dependent component $T_{A-R}$, the operation-angle-dependent component $T_{A-θ}$ is a component for applying the counter torque $T_A$ in the direction reverse to the direction of the operation-torque-dependent component $T_{A-TO}$. As illustrated in FIG. 2C, the operation-angle-dependent component $T_{A-θ}$ is determined such that the counter torque $T_A$ increases with an increase in the operation angle θ of the steering wheel 30 and decreases with an increase in the running speed v of the vehicle. As for the sign (±) of the operation-torque-dependent component $T_{A-TO}$, the operation-speed-dependent component $T_{A-R}$, and the operation-angle-dependent component $T_{A-θ}$, the sign of the operationtorque-dependent component $T_{A\text{-}TO}$ generally differs from the sign of the operation-speed-dependent component $T_{A\text{-}R}$ and the sign of the operation-angle-dependent component $T_{A\text{-}\theta}$ for one steering operation, as apparent from the graphs of FIGS. 2A-2C.

There is supplied, to the electric motor 102 of the operation assist device 100, an electric current based on the thus determined assist torque $T_A$ so as to apply the assist torque $T_A$ to the steering shaft 34. It is noted that the operation torque $T_O$ is obtained based on detection by the operation torque sensor 62, and the operation angle $\theta$ of the steering wheel 30 is obtained based on detection by the operation angle sensor 112. The operation speed $d\theta/dt$ of the steering wheel 30 is identified based on the obtained operation angle $\theta$ of the steering wheel 30, and the vehicle running speed v is identified based on wheel rotation speeds $v_W$ detected by the corresponding wheel speed sensors 114 provided for the respective four wheels.

iii) Control Flow

Figure 3:
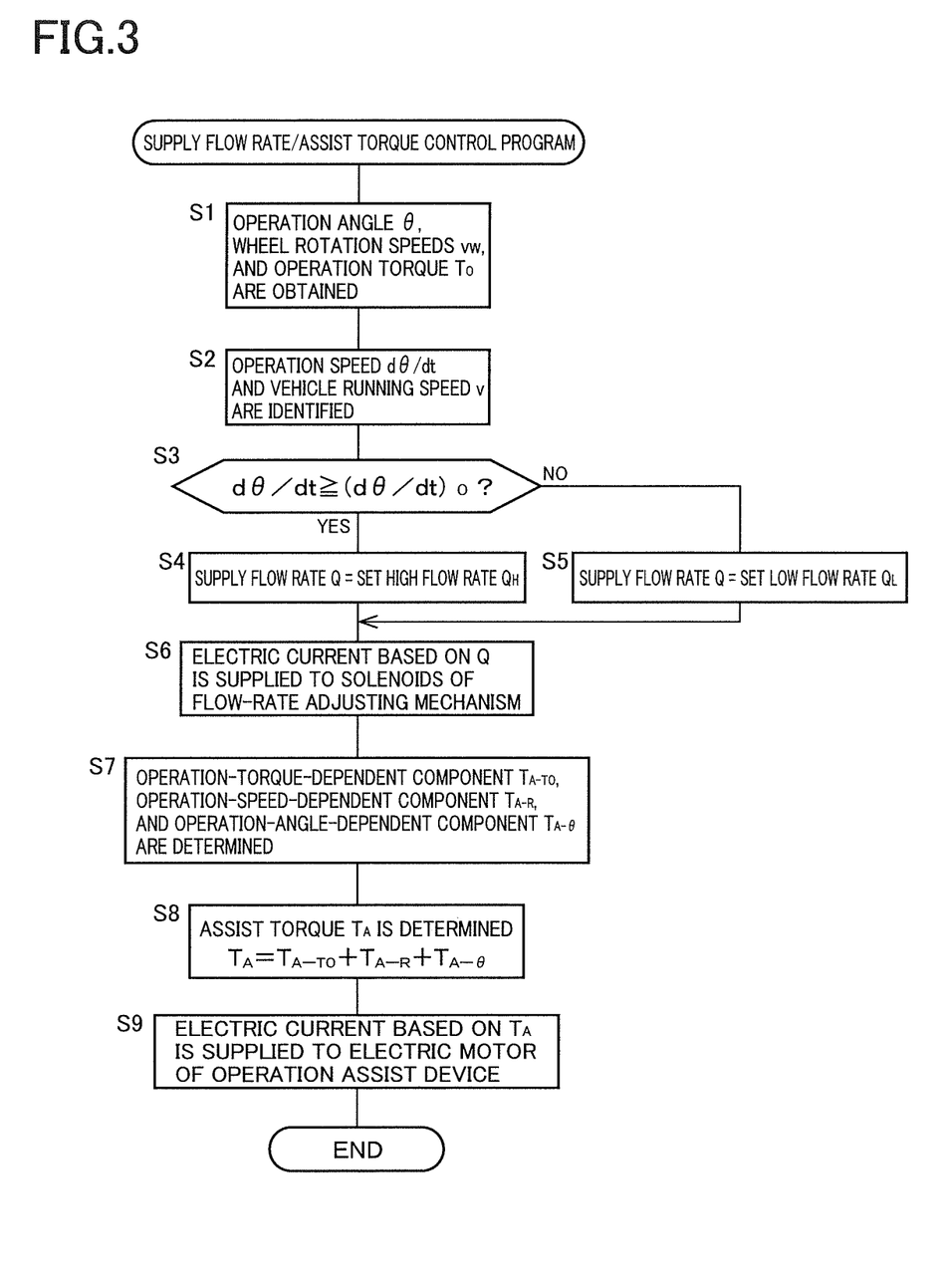
FIG. 3 is a flowchart of a control program executed in the steering system of the embodiment.

The computer of the ECU 110 repeatedly executes a supply flow rate/assist torque control program indicated by a flowchart of FIG. 3 at a short time pitch, e.g., about several to several tens of milliseconds (msec), so that the control of the supply flow rate Q of the working fluid in the steering assist device 70 and the control of the assist torque $T_A$ applied by the operation assist device 100 are executed. Referring to the flowchart, there will be briefly explained a process of the two controls.

The process according to the program starts with Step 1 at which the ECU 110 obtains the operation angle $\theta$ of the steering wheel 30, the wheel rotation speeds $v_W$, and the operation torque $T_O$ applied to the steering shaft 34 from the steering wheel 30 respectively based on the detection by the operation angle sensor 112, the detection by the wheel speed sensors 114, and the detection by the operation torque sensor 62. Step 1 is abbreviated as "S1" and other steps are similarly abbreviated. At S2, the ECU 110 identifies the operation speed $d\theta/dt$ of the steering wheel 30 and the vehicle running speed v respectively based on the operation angle $\theta$ and the wheel rotation speeds $v_W$ obtained as described above.

At S3, the ECU 110 determines whether the identified operation speed $d\theta/dt$ is not lower than the set threshold speed $(d\theta/dt)_0$. When the operation speed $d\theta/dt$ is not lower than the set threshold speed $(d\theta/dt)_0$, the ECU 110 determines, at S4, the supply flow rate Q of the working fluid that should be attained to be equal to the set high flow rate $Q_H$, for increasing the assist force applied by the steering assist device 70. On the other hand, when the operation speed $d\theta/dt$ is lower than the set threshold speed $(d\theta/dt)_0$, the ECU 110 determines, at S5, the supply flow rate Q of the working fluid that should be attained to be equal to the set low flow rate $Q_L$, for keeping the assist force applied by the steering assist device 70 small. At S6, the ECU 110 supplies an electric current based on the determined supply flow rate Q to the solenoid of the flow-rate adjusting mechanism 96.

At S7, the ECU 110 determines the operation-torque-dependent component $T_{A\text{-}TO}$, the operation-speed-dependent component $T_{A\text{-}R}$, and the operation-angle-dependent component $T_{A\text{-}\theta}$ based on the obtained operation torque $T_O$, the obtained operation angle $\theta$ of the steering wheel 30, the identified operation speed $d\theta/dt$ of the steering wheel 30, and the identified vehicle running speed v according to the respective three functions indicated above. At S8, the ECU 110 adds up the operation-torque-dependent component $T_{A\text{-}TO}$, the operation-speed-dependent component $T_{A\text{-}R}$, and the operation-angle-dependent component $T_{A\text{-}\theta}$ so as to determine the assist torque $T_A$ to be applied by the operation assist device 100.

At S9, the ECU 110 supplies an electric current based on the assist torque $T_A$ determined as described above to the electric motor 102 of the operation assist device 100. One cycle of the process according to the control program is ended by execution of the process described above.

What is claimed is:

1. A steering system installed on a vehicle, comprising:
a steering operation member operated by a driver;
a steering shaft coupled to the steering operation member and configured to rotate in accordance with an operation of the steering operation member;
a steering mechanism including a steering member coupled to a wheel and configured to cause the steering member to move in accordance with rotation of the steering shaft so as to enable the wheel to be steered in accordance with a movement of the steering member;
an operation assist device configured to apply a torque to the steering shaft so as to assist the operation of the steering operation member;
a steering assist device including a working-fluid supply source for supplying a working fluid and a flow-rate adjusting mechanism configured to adjust a supply flow rate that is a flow rate of the working fluid supplied from the working-fluid supply source, the steering assist device being configured to assist the movement of the steering member of the steering mechanism utilizing the working fluid supplied from the working-fluid supply source; and
a controller configured to control the torque applied to the steering shaft by the operation assist device and configured to control the flow-rate adjusting mechanism of the steering assist device so as to control the supply flow rate of the working fluid,
wherein the steering assist device is configured to assist the movement of the steering member with an assist force that depends on the supply flow rate of the working fluid, and
wherein the controller is configured to increase the supply flow rate of the working fluid such that the working fluid increases from moving at a first flow rate to moving at a second flow rate when an operation speed of the steering operation member becomes equal to or higher than a set threshold speed.

2. The steering system according to claim 1,
wherein the steering mechanism includes an input shaft to which the steering shaft is coupled and which is rotated by the steering shaft, and
wherein the steering assist device is configured to assist the movement of the steering member with the assist force corresponding to a steering torque that is a torque applied to the input shaft by the steering shaft.

3. The steering system according to claim 1, wherein the steering assist device includes, as the working-fluid supply source, an engine pump configured to be rotated by an engine of the vehicle.

4. The steering system according to claim 1, wherein the operation assist device includes an electric motor as a source of generation of the torque applied to the steering shaft.

5. The steering system according to claim 1, further comprising an operation torque sensor for detecting an operation torque that is a torque applied to the steering shaft by the operation of the steering operation member, wherein the controller is configured to control, in accordance with the detected operation torque, the torque applied to the steering shaft by the operation assist device.

6. The steering system according to claim 1, wherein the controller is configured to control, based on the operation speed of the steering operation member, the torque applied to the steering shaft by the operation assist device.

7. The steering system according to claim 1, wherein the controller is configured to control, based on an operation amount of the steering operation member, the torque applied to the steering shaft by the operation assist device.

8. The steering system according to claim 1, wherein the controller is configured to control, based on a running speed of the vehicle, the torque applied to the steering shaft by the operation assist device.

9. The steering system according to claim 1, wherein the first flow rate is a flow rate greater than zero.

10. The steering system according to claim 1, wherein before the operation speed of the steering operation member becomes equal to or higher than the set threshold speed, the working fluid is circulated between the working-fluid supply source and a working-fluid reservoir.

* * * * *